(12) United States Patent
Tsuchiya et al.

(10) Patent No.: US 6,321,974 B1
(45) Date of Patent: Nov. 27, 2001

(54) METHOD FOR ULTRASONIC BONDING OF SLIDER AND LEAD IN A HARD DISK DRIVE HEAD GIMBAL ASSEMBLY

(75) Inventors: Tatsumi Tsuchiya, Ayase; Tatsushi Yoshida, Chigasaki; Takuya Satoh, Hayama-Machi; Akiko Hayashi, Yamato, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/553,596

(22) Filed: Apr. 20, 2000

(30) Foreign Application Priority Data

Apr. 30, 1999 (JP) ................................. 11-123517

(51) Int. Cl.[7] ............................. B23K 1/06; B23K 20/10; B23K 31/02
(52) U.S. Cl. ......................... 228/110.1; 228/1.1; 228/212
(58) Field of Search .................. 228/1.1, 110.1, 228/212, 213, 49.1, 49.5, 44.7; 156/73.1

(56) References Cited

U.S. PATENT DOCUMENTS

| 4,605,977 | * | 8/1986 | Matthews . |
| 4,759,073 | * | 7/1988 | Shah et al. . |
| 4,996,623 | * | 2/1991 | Erpelding et al. . |
| 5,528,819 | * | 6/1996 | McKay et al. . |
| 5,608,591 | * | 3/1997 | Klaassen . |
| 5,742,996 | * | 4/1998 | Frater et al. . |
| 5,761,005 | * | 6/1998 | McKay et al. . |
| 5,818,662 | * | 10/1998 | Shum . |
| 5,821,494 | * | 10/1998 | Albrecht et al. . |
| 5,839,193 | * | 11/1998 | Bennin et al. . |
| 5,844,751 | * | 12/1998 | Bennin et al. . |
| 5,864,445 | * | 1/1999 | Bennin et al. . |
| 6,130,863 | * | 10/2000 | Wang et al. . |

FOREIGN PATENT DOCUMENTS

| 4111096710-A | * | 4/1999 | (JP) . |
| 2000315308-A | * | 11/2000 | (JP) . |
| 2001014625-A | * | 1/2001 | (JP) . |

OTHER PUBLICATIONS

Matz US 2001/0001588 A1 May 24, 2001.*
Lee et al. US 2001/0001587 A1 May 24, 2001.*

* cited by examiner

Primary Examiner—Tom Dunn
Assistant Examiner—Kiley Stoner
(74) Attorney, Agent, or Firm—Robert B. Martin; Bracewell & Patterson, L.L.P.

(57) ABSTRACT

A plurality of bonding pads formed on a slider are integrally joined to an elastic flexure for a disk drive suspension. The pads are ultrasonically bonded to the slider with leads that are held by the flexure. The bonding portions of the leads face and are pressed against the pads with ultrasonic waves. The leads are plastically deformed during these steps to prevent the flexure from being deformed after the ultrasonic bonding process.

4 Claims, 12 Drawing Sheets

METHOD FOR ULTRASONIC BONDING OF SLIDER AND LEAD IN A HARD DISK DRIVE HEAD GIMBAL ASSEMBLY

BACKGROUND OF THE INVENTION

1. Technical Field:

The present invention relates to a method for manufacturing a head gimbal assembly (hereinafter referred to as an HG assembly) serving as a component of a hard disk drive, and in particular to a method for connecting a terminal held by the slider of the HG assembly to a head, and a lead held by the HG assembly that is connected to an external unit.

2. Description of the Related Art:

Referring to FIG. 12, a conventional head gimbal assembly connection method includes a flexure 101 for holding a slider 102. The slider 102 is disposed at the front end of an HG assembly and integrally held by a bonding fixture 100. A platform 103 serving as the foremost end of the flexure 101 fixes and holds the vicinity of the front end of a lead 104 through an insulating sheet 105. Four bonding pads 108 connected to a head (not shown) are formed on the front end face of the slider 102. The front end of each lead 104 is curved so as to approach the bonding pad 108 (shown by a broken line in FIG. 12).

A wedge 106 of an ultrasonic bonder is moved by moving means (not shown) in the direction of the arrow K to press the front end of the lead 104 against the contacted bonding pad 108 at a predetermined load. In this state, ultrasonic vibrations (at approximately 60 kHz) are applied to the wedge 106 in the direction of the arrow L to bond the lead 104 to the bonding pad 108.

When the front end of the lead 104 is pressed against the bonding pad 108 by the wedge 106, a pair of supports 107 are set to the bottom faces of both the sides of the platform 103 in order to prevent the platform 103 of the flexure 101 from being deflected due to the rigidity of the lead (FIG. 13). When the lead 104 is pressed in this manner and ultrasonic vibrations are applied, the lead 104 is plastically deformed and bonded to the bonding pad 108 and stabilized.

However, because it is difficult to accurately bring the support 107 into contact with the platform 103 without forming a gap h (FIG. 13) between the platform 103 and the support 107, or without pushing the platform 103 up for the accuracy of the bonding fixture 100 or positioning accuracy of the ultrasonic bonder 70, the flexure 101 may be deformed during this step. If the flexure 101 is deformed, the static posture of the HG assembly becomes unstable and the flight posture of the slider 102 may be affected.

SUMMARY OF THE INVENTION

A plurality of bonding pads formed on a slider are integrally joined to an elastic flexure for a disk drive suspension. The slider has a suction device for contacting and fixing a platform of the flexure relative to the suction device. The pads are ultrasonically bonded to the slider with leads that are held by the flexure. The bonding portions of the leads face and are pressed against the pads with ultrasonic waves. The leads are plastically deformed during these steps to prevent the flexure from being deformed after the ultrasonic bonding process.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
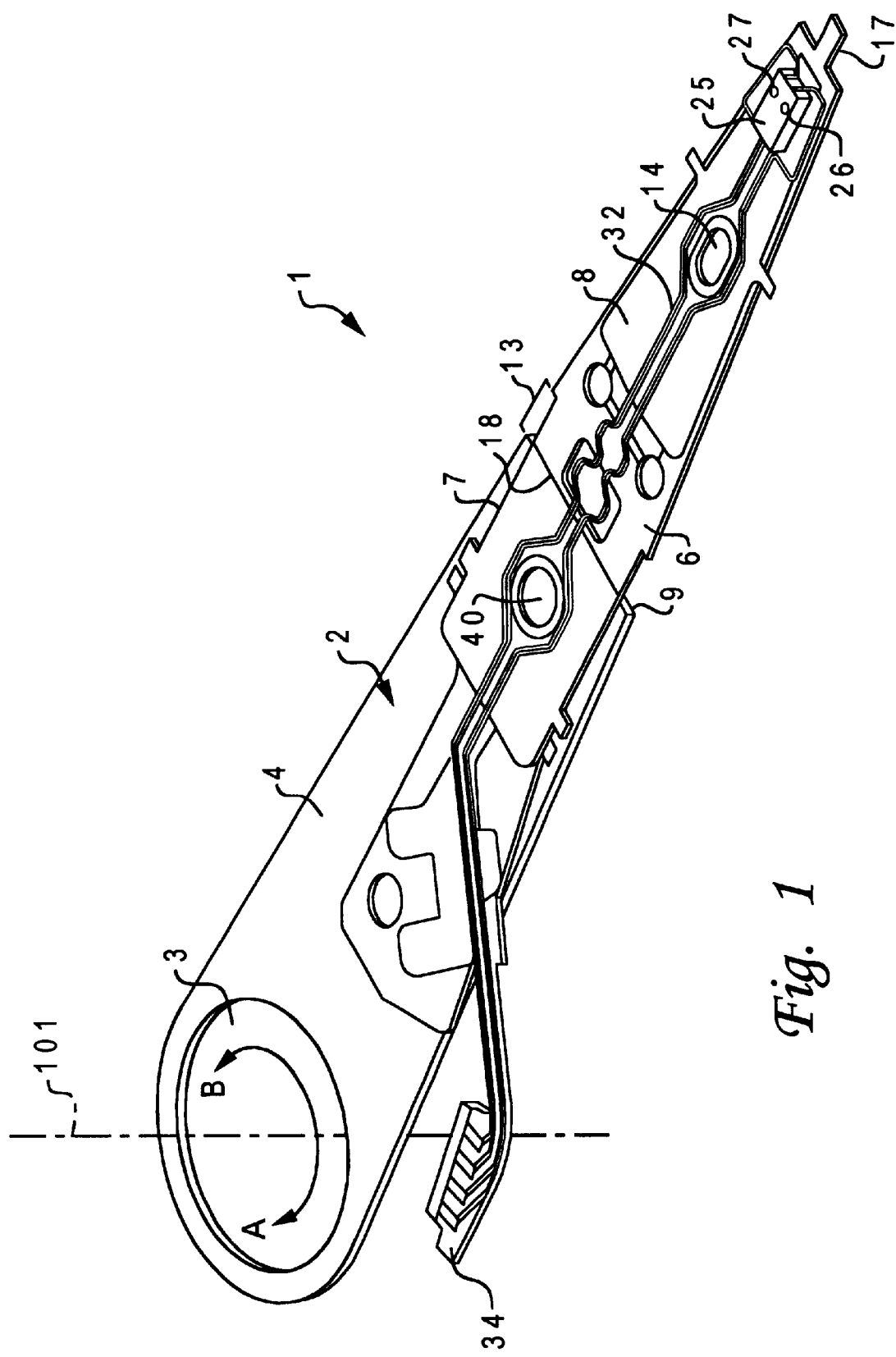
FIG. 1 is a perspective view of a head gimbal assembly constructed in accordance with the invention.
Figure 2:
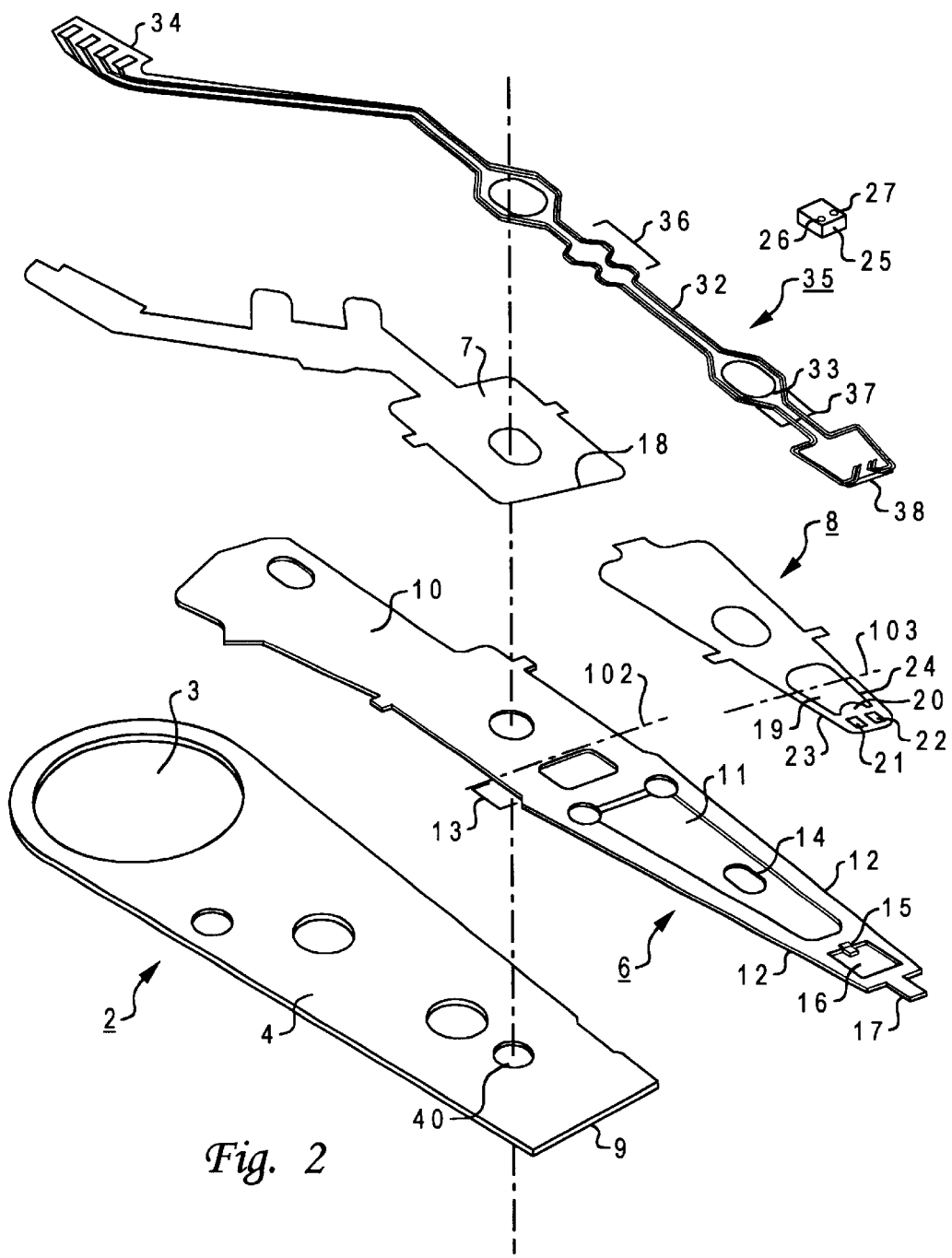
FIG. 2 is an exploded perspective view of the head gimbal assembly of FIG. 1.

With reference now to the figures and in particular with reference to FIG. 1, there is depicted a perspective view of an HG assembly 1 used for embodiments of the present invention. FIG. 2 is an exploded perspective view serially showing overlapped components of the HG assembly 1 by separating them from each other. In FIG. 1, an actuator arm 2 is rotatably held by the holding means of a magnetic disk drive (not shown). In this case, an opening 3 is used to hold the arm 2 and rotated about a virtual axis 101 (FIG. 1) almost vertical to a flat portion 4 passing through the center of the opening 3 in the direction of the arrow A or B. The rotation is performed by a voice coil motor (not shown).

A load beam 6, a mount plate 7, and a flexure 8 are bonded to each other in accordance with the predetermined relation described below and particularly, the load beam 6 and the flexure 8 configure an integrated suspension. A flat portion 10 of the load beam 6 is securely bonded to the flat portion 4 of the actuator arm 2 so that the end side 9 of the actuator arm 2 falls in line with an indication line 102 (FIG. 2) of the load beam 6. The load beam 6 is made of an elastic stainless steel plate having a thickness of, for example, 0.038 to 0.05 mm. Therefore, the beam 6 is thin and lightweight and moreover, it is devised so as to be able to keep a necessary rigidity.

A substantially trapezoidal, concave depression 11 in the vertical direction of FIG. 2 is formed by pressing a predetermined portion of the load beam 6 not bonded to the actuator arm 2. Both margins along the longitudinal direction are bent except for a portion 13 close to the end side 9 and a flange 12 (FIG. 3) that is formed to improve the rigidity. The portion 13 where the flange 12 is not formed configures an elastic hinge portion. A tapered oval control hole 14 is formed in the depression 11 of the load beam 6 and an almost quadrangular opening 16 is formed near the front end. A gimbal pivot 15 is turned upward on FIG. 2 and is formed on the protruded portion of the opening 16 toward the center of the opening 16 from the center of one side of the opening 16 close to the depression 11. A tab 17 is formed at the front end of the load beam 6.

The mount plate 7 and the flexure 8 are bonded to the load beam 6. The mount plate 7 is set so that the end side 18 falls in line with the indication line 102 (FIG. 2) of the load beam 6. The flexure 8 is bonded to the load beam 6 except the portion closest to the front end from an indication line 103 (FIG. 2) so as to cover the trapezoidal depression 11 of the load beam 6. The flexure 8 is formed with a stainless steel plate having a thickness of, for example, approximately 20 microns and has a desired elasticity. Moreover, an arched opening 19 is formed from a bonding portion to a non-bonding portion. A suspension tongue 20 protruding toward the center of the opening 19 is formed at the center of the bottom of the opening 19 close to the front end of the flexure 8. It is possible to form the mount plate 7 with stainless steel as well as the material of the flexure 8.

An integrated conductive lead 35 is formed so that four leads 32 are integrally bonded by preventing the leads 32 from contacting with a very thin insulating sheet 33. One ends of the leads are lined up in order to configure a multi-connector portion 34 and the other ends of them are bent so as to be connected to four bonding pads 28, 29, 30, and 31 (FIG. 9) formed on a slider 25 through a connection method to be mentioned later.

Then, the portion extending from the multi-connector portion 34 up to the curved portion 36 (excluding the curved portion 36) of the integrated conductive lead 35 is bonded onto the mount plate 7 as shown in FIG. 1. Then, the portion extending from the curved portion 36 (excluding the portion 36) up to the terminal 37 of the insulating sheet 33 and other bent ends of the leads 32 are bonded to the flexure 8. The other ends are bonded through the insulating sheet 38.

Figure 9:
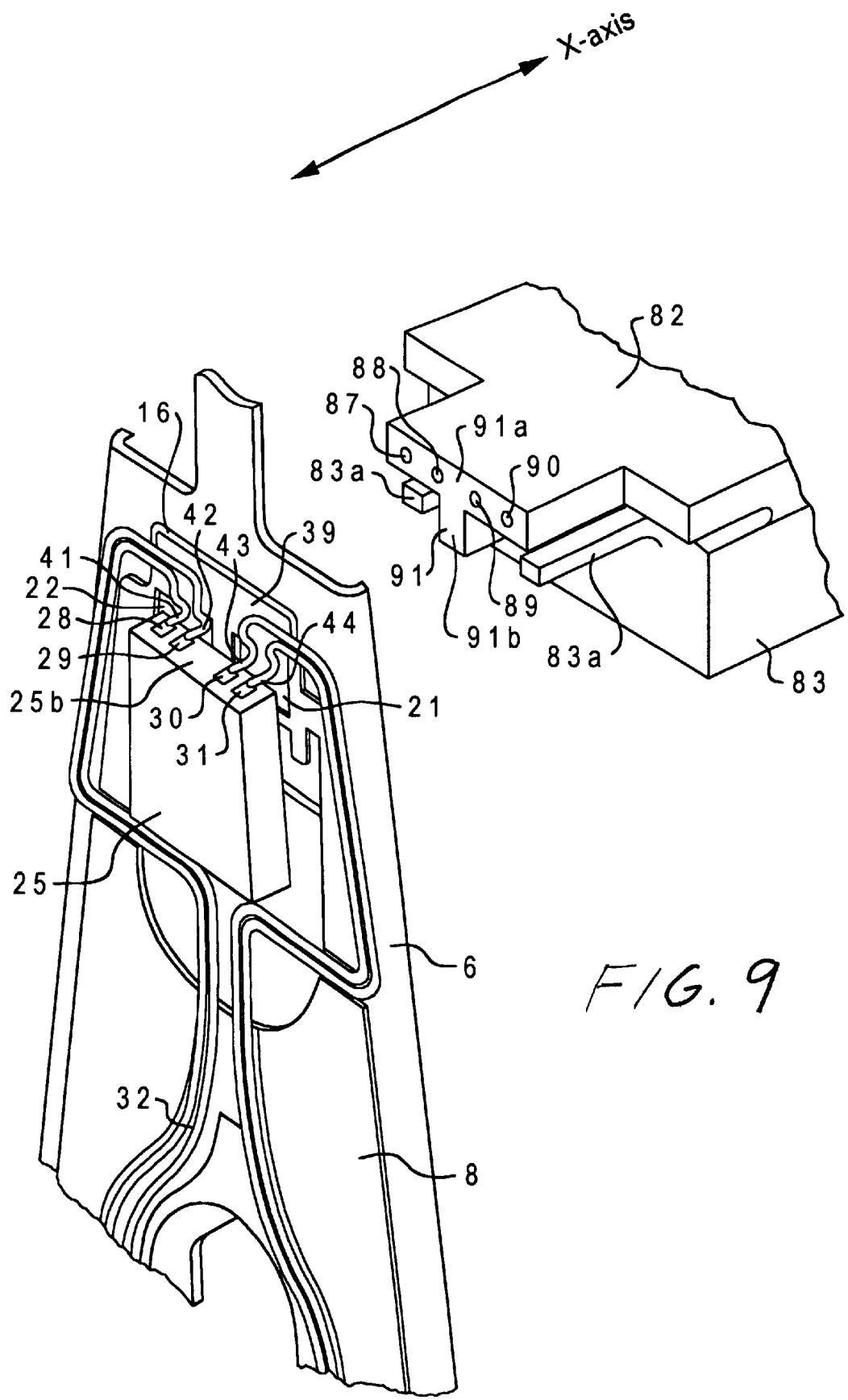
FIG. 9 is a perspective view showing a slider and the front end of a suction unit.

A magnetoresistive head for reading data (hereafter referred to as MR head) 26 and an electromagnetic induction-type write head 27 are respectively arranged to a predetermined position of the slider 25 (the position of the head in FIG. 1 is not accurate because the head is shown only for convenience' sake). Each of these heads has two leader lines (not illustrated) and each leader line is connected to four bonding pads 28, 29, 30, and 31 (FIG. 9). Moreover, the slider 25 is fixed to the suspension tongue 20 by an adhesive. Then, mutual arrangement between a pair of flexure arms 23 and 24 configured by both the sides of the opening 19 of the flexure 8, a pair of openings 21 and 22 formed nearby the front end of the flexure 8, the gimbal pivot 15 formed on the load beam 6, and the slider 25 bonded to the suspension tongue 20 is described below.

Figure 3:
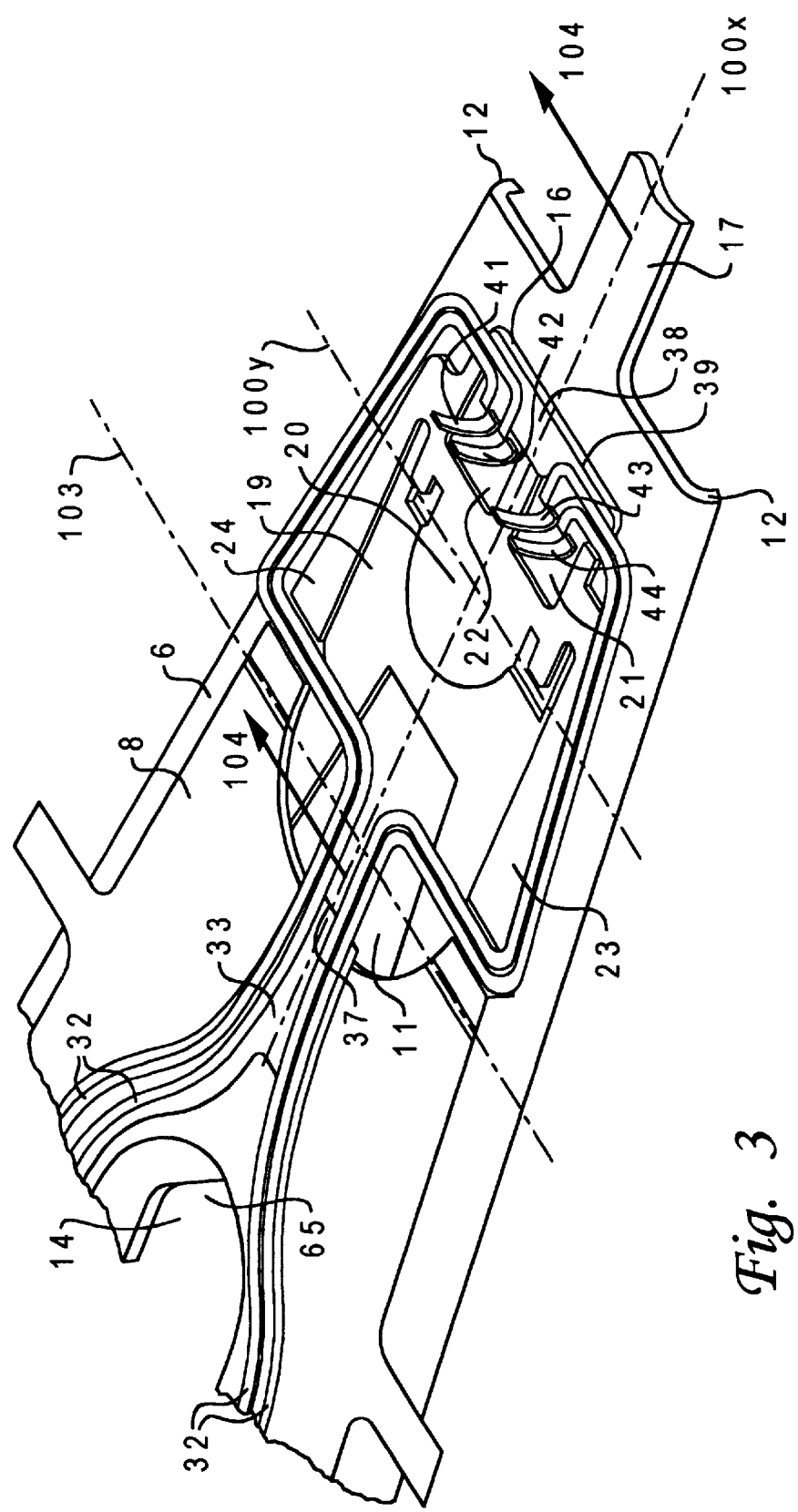
FIG. 3 is an enlarged perspective view of a front end of the head gimbal assembly of FIG. 1.
Figure 4:
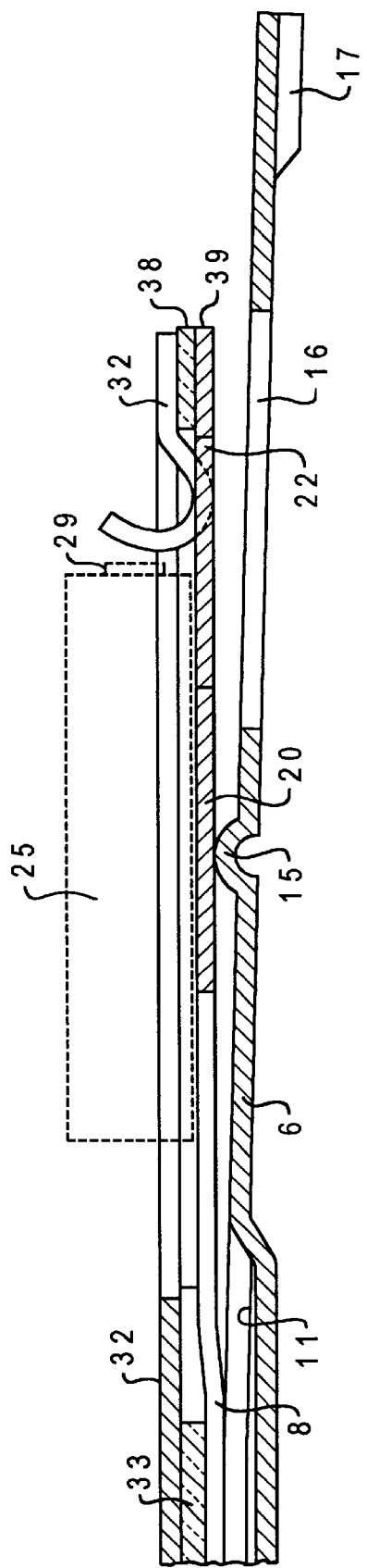
FIG. 4 is a sectional side view of the head gimbal assembly of FIG. 3 taken along the line 104—104 of FIG. 3.

FIG. 3 is a locally enlarged view of the front end of the HG assembly 1 before the slider 25 is set and FIG. 4 is a sectional view of the front end at the position shown by the indication line 104. As described above, the gimbal pivot 15 (FIG. 4) is formed on the load beam 6. Moreover, the flexure 8 is bonded to the load beam 6 up to the indication line 103 and the extended flexure arms 23 and 24 without being bonded elastically support the suspension tongue 20 continued from the arms 23 and 24.

By bonding the load beam 6 with the flexure 8, the suspension tongue 20 is supported by the gimbal pivot 15 at one point. The contact portion is present on a 100x axis (FIG. 3) corresponding to the center line of the flexure 8 in the longitudinal direction and a 100y axis perpendicularly intersecting the 100x axis by passing through the contact portion is shown in FIG. 3. In this case, the flexure arms 23 and 24 press the suspension tongue 20 against the gimbal pivot 15 while slightly warping.

The slider 25 is set to the suspension tongue 20 so that the center of the slider 25 is almost superimposed on the contact portion with the gimbal pivot 15 (shown by a broken line in FIG. 4) as described below. Thereby, the slider 25 can slightly move about the 100x and 100y axes and tilt up to a predetermined angle in every direction.

Though the four leads 32 are fixed to the flexure 8 up to the terminal 37 of the insulating sheet 33, they are moreover fixed to the flexure 8 through the insulating sheet 38 on the platform 39 at the foremost end of the flexure 8 located at the opposite side to the suspension tongue 20 at both the sides of two openings 21 and 22.

In the above range, the four leads 32 are bent like a crank along the flexure arms 23 and 24 every two leads as a pair and levitated so as not to contact each other. The other ends of each pair of leads 32 are curved so toward the suspension tongue 20 through the two openings 21 and 22 from the platform 39 to form connection terminals 41, 42, 43, and 44 respectively curved like a hook so as to face the bonding pads 28, 29, 30, and 31 (FIG. 9) formed on the slider bonded to the suspension tongue 20.

Figure 5:
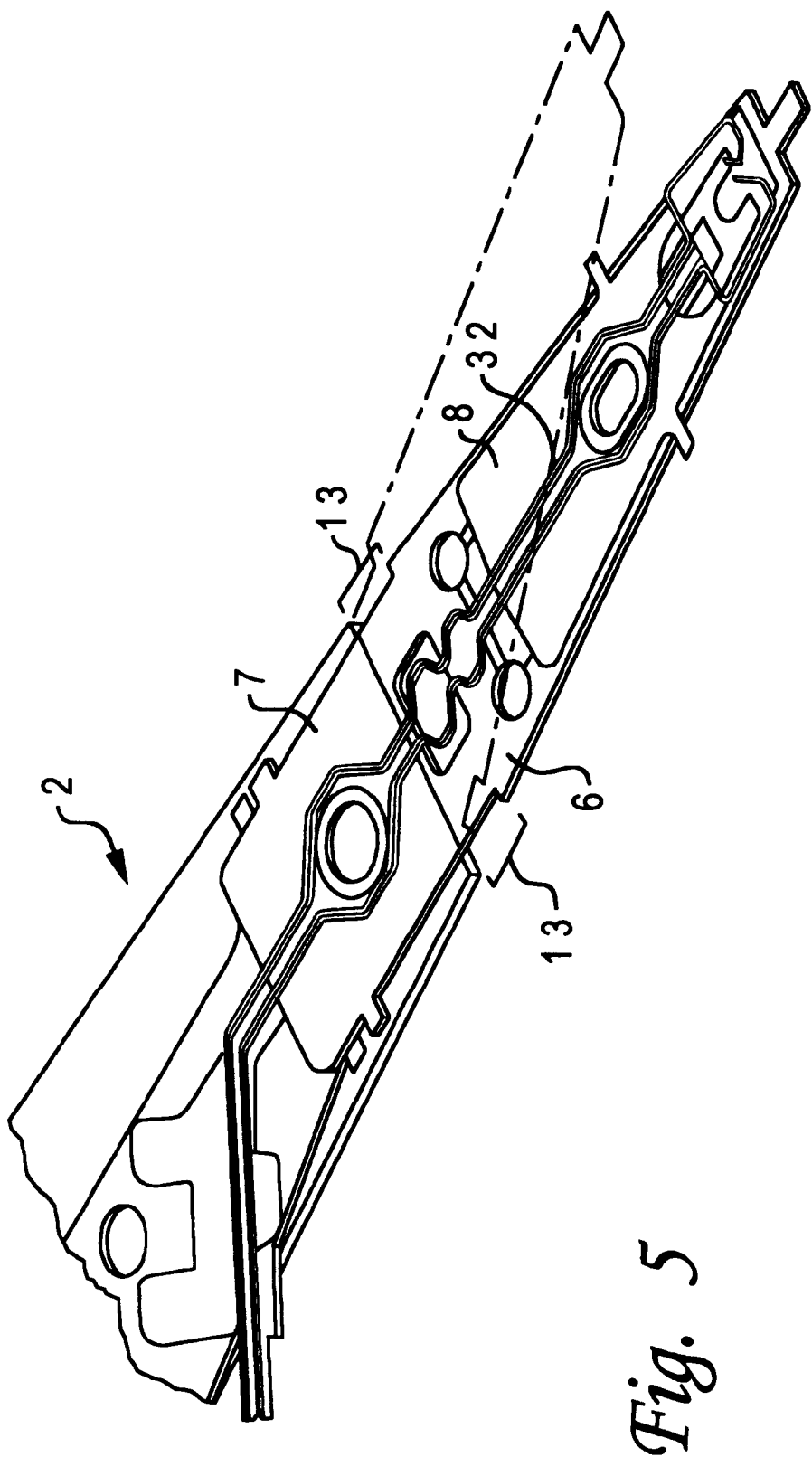
FIG. 5 is the head gimbal assembly of FIG. 1 showing a range of flexure.

The HG assembly 1 configured as described above except the slider 25 is bent for example, by approx. 19° at the hinge 13 of the load beam 6 as shown by an alternate long and short dash line in FIG. 5. This bend is formed due to plastic deformation and this. angle is kept in the free state. Then, a method for bonding the slider 25 to the suspension tongue 20 of the above flexure 8 will be described below.

Figure 6:
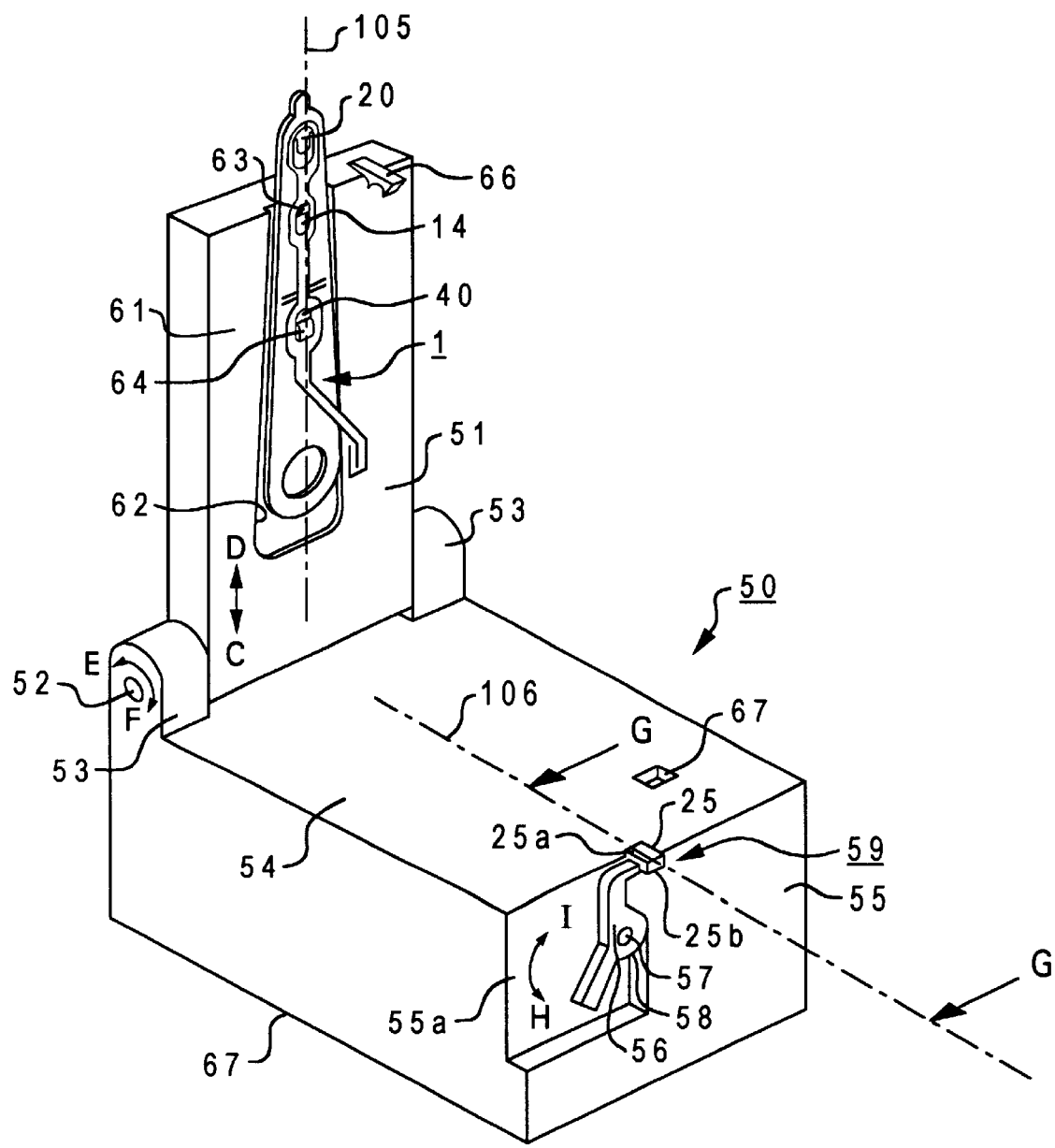
FIG. 6 is a perspective view of a bonding fixture constructed in accordance with the invention.

FIG. 6 is a perspective view showing a bonding fixture 50 for positioning the suspension tongue 20 of the HG assembly 1 before the slider 25 is bonded and the slider 25 and connecting them each other. A pair of supports 53 and 53 for holding an HG assembly holding plate 51 rotatably about an axis 52 is formed at one end side of the upper face 54 of the bonding fixture 50. A mounting portion 59 for mounting the slider 25 is formed at the center of the other end side facing the one end side.

The HG assembly holding plate 51 is deviated in the direction of the arrow E by a deviation means (not shown) and rotation of the plate 51 in the direction of the arrow E is limited at the almost vertical position shown in FIG. 6. A depression 55a is formed on the lateral face 55 close to the mounting portion 59 and a slider fixing lever 56 is held by the depression 55a rotatably about an axis 57. The slider fixing lever 56 is rotatably deviated in the direction of the arrow I by a toggle spring 58.

Figure 7:
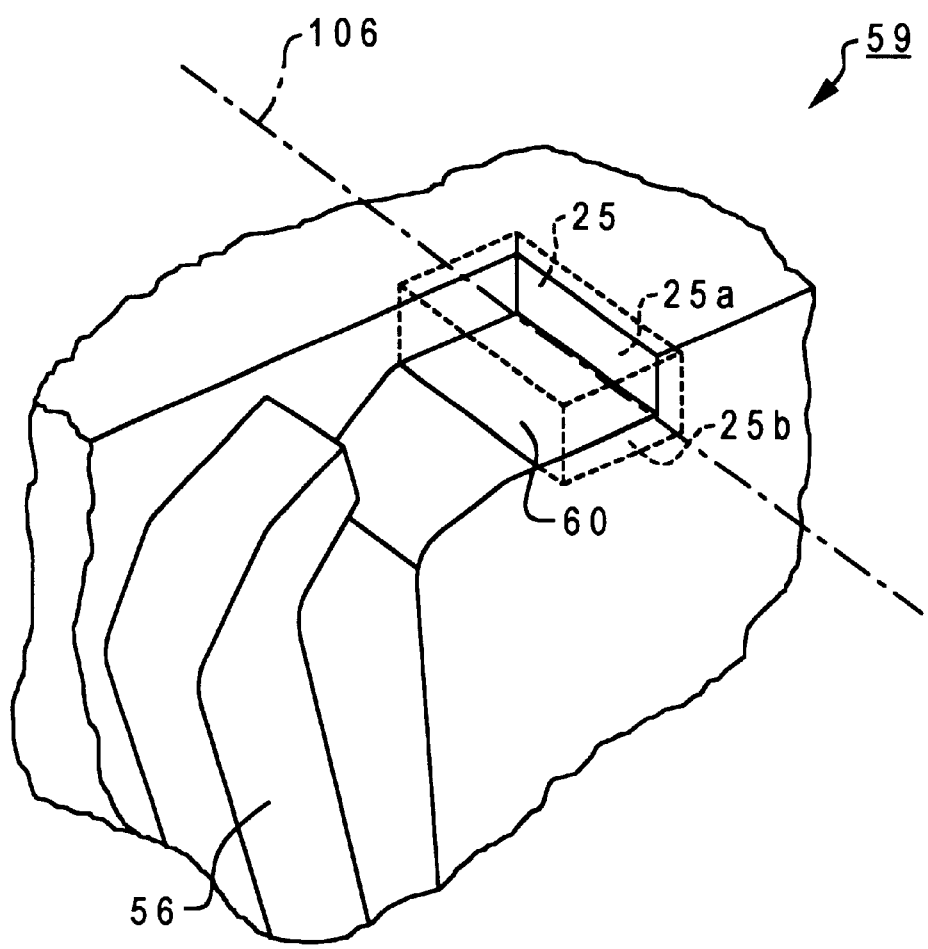
FIG. 7 is an enlarged view of a portion of the bonding fixture of FIG. 6.

FIG. 7 is a locally enlarged view of the mounting portion 59, showing a state in which the slider fixing lever 56 is rotated against a deviation force by an operator in the direction of the arrow H. Under the above state, the slider 25 is set to a slider fixing table 60 for controlling the position of the slider 25 by three adjacent walls as shown by broken lines in FIG. 7. When the slider fixing lever 56 is released, the front end of the slider fixing lever 56 presses the lateral face of the slider 25 to fix the slider 25. FIG. 6 shows the above state in which the bonding face 25a and front face 25b (FIG. 7) of the slider 25 are set so as to slightly protrude from the upper face 54 and lateral face 55 of the bonding fixture 50.

A storing depression 62 along the outline of the HG assembly 1 is formed on the holding face 61 of the HG-assembly holding plate 51 in order to store the HG assembly 1 before the slider 25 is bonded (FIG. 6). A position control pin 63 and a setting hook 64 are formed on the center line 105 of the HG-assembly holding plate 51 in the longitudinal direction at a predetermined position of the storing depression 62. The setting hook 64 is held by an urging means (not shown) so that it can slide on the center line 105 by a predetermined range and urged in the direction of the arrow C toward the axis 52.

When an operator sets the HG assembly 1 to the HG assembly holding plate 51, the operator first hangs the elongating hole 40 of the HG assembly 1 on the setting hook 64 and pulls the HG assembly 1 against an urging force in the direction of the arrow D. Then, the operator fits the position control pin 63 into the tapered oval control hole 14 of the HG assembly 1.

In this case, the position control pin 63 engages with a control end 65 (FIG. 3) having a diameter smaller than that of the control hole 14 to perform positioning so that the 100x axis (FIG. 3) of the flexure 8 fits with the center line 105. Moreover, though the HG assembly 1 is bent by approx. 19° at the hinge 13 (FIG. 5) under the free state as described above, it extends almost straight because the hinge portion 13 is elastically deformed when it is set to the HG assembly holding plate 51. A protrusion (not shown) is formed at the engagement portion side with the control hole 14 at the front end of the position control pin 63 to prevent the HG assembly 1 from being bent due to a restoring force while allowing a slight play.

As described above, the HG assembly 1 and slider 25 are set to the bonding fixture 50 as shown in FIG. 6. When the HG assembly holding plate 51 is rotated against a deviation force by an operator in the direction of the arrow F and becomes almost horizontal, a locking hook 66 engages with an engaging holder 68 formed at a corresponding position of the upper face 54 by facing the HG assembly holding plate 51 and thereby, the horizontal position is kept.

In this case, the center line 106 parallel with the upper face 54 and perpendicular to the parallel line of the rotation axis 52 and the 10x axis (FIG. 3) of the flexure 8 are almost fitted to each other by passing through the center of the bonding face 25a of the slider and the suspension tongue 20 of the HG assembly 1 and the bonding face 25a of the slider 25 contact each other as described below.

Therefore, by applying a predetermined adhesive to the bonding face 25a (FIG. 7) of the slider 25 and rotating the HG-assembly holding plate 51 and thereby locking the plate 51 to a horizontal position in the state where the HG-assembly holding plate 51 is disposed at a vertical position shown in FIG. 6, it is possible to bond the slider 25 to the suspension tongue 20 of the flexure 8. Then, a method for connecting the bonding pads 28, 29, 30, and 31 (FIG. 9) formed on the slider 25 with the connection terminals 41, 42, 43, and 44 (FIG. 9) of the four leads 32 is described below.

Figure 8:
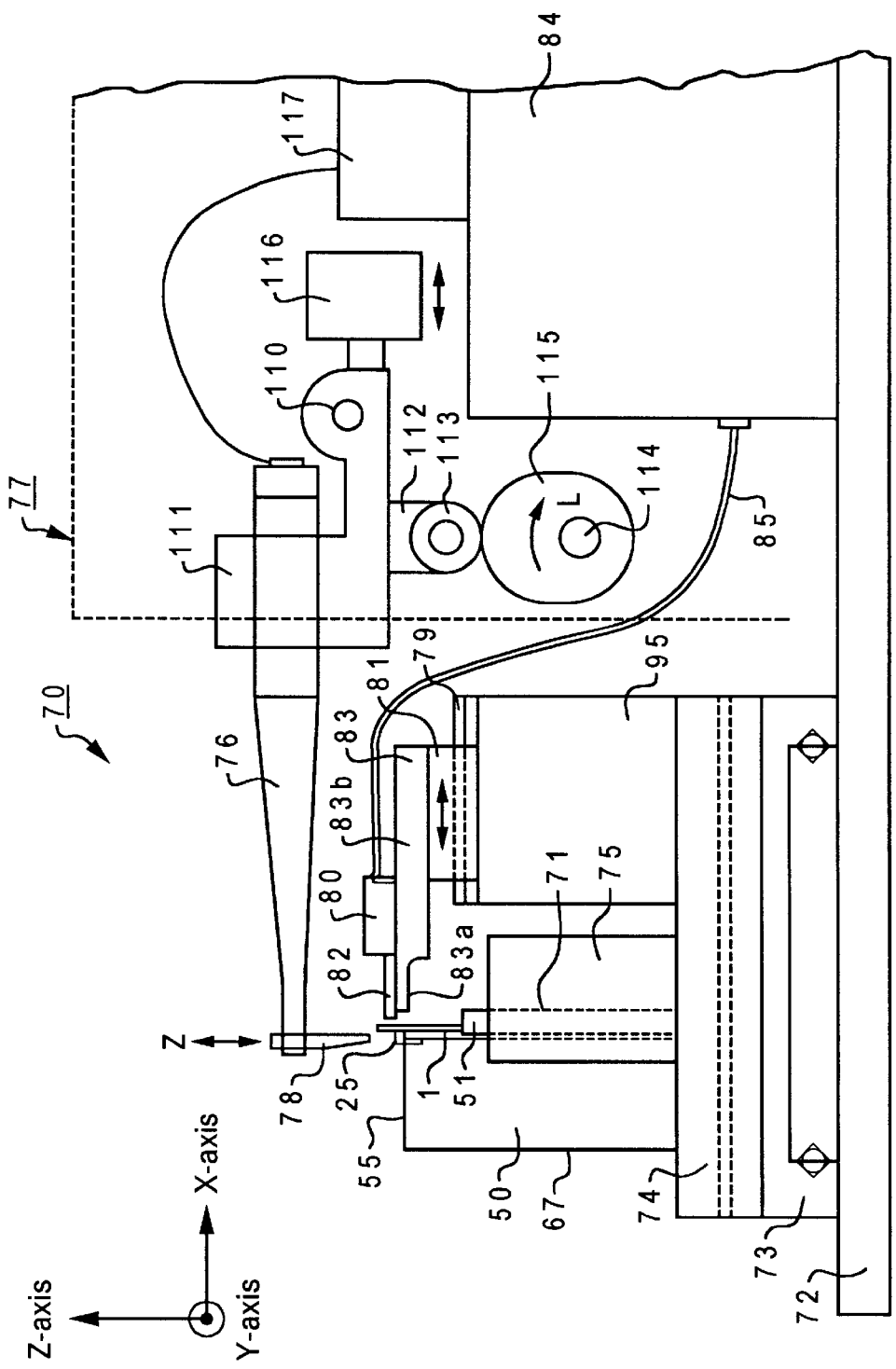
FIG. 8 is a front view an ultrasonic bonder.

FIG. 8 is a front view showing the configuration of an ultrasonic bonder. The ultrasonic bonder 70 holds a Y-table 73 so as to be movable in Y-axis direction on a base 72. The Y-table 73 holds an X-table 74 so as to be movable in X-axis direction. A position control member 75 having a fitting depression 71 to which the portion of the HG-assembly holding plate 51 of the bonding fixture 50 mounted by turning the lateral face 55 upward is fitted for positioning is formed on the upper face of the X-table 74.

The bonding fixture 50 is pressed against the position control member 75 from the bottom 67 side by an air clamp means (not shown) and fixed onto the X-table 74. The Y-table 73 and X-table 74 are respectively driven by a driving means (not shown) and move the bonding fixture 50 along the X-Y plane as described later. A holding table 95 fixed onto the X-table 74 holds a guide rail 79 extending in X-axis direction and moves a moving table 81 by not-illustrated driving means along X-axis. The moving table 81 holds a suction table 83 and a suction unit 80 is held on the upper face 83b of the suction table 83 slidably in a predetermined range along X-axis direction.

The suction unit 80 is slightly urged in the left direction of FIG. 8 by not-illustrated urging means but as shown in FIG. 8, movement of the suction unit 80 is limited at a position where the front end of a suction pad 82 slightly protrudes from the front ends of a pair of the following dampers 83a and 83a corresponding to the front end of the suction table 83.

FIG. 9 is a perspective view showing the slider 25, the suction unit 80, and the vicinity of the front end of the damper 83a shown in FIG. 8 viewed from the top left of this side. However, the bonding fixture 50 is omitted for convenience, sake. The bonding pads 28, 29, 30, and 31 connected to the leader lines (not illustrated) of the above-described two heads are formed on the front face 25b of the slider 25 bonded to the suspension tongue 20 of the flexure 8. Connection ends 41, 42, 43, and 44 of the four leads respectively face each pad. As described above, these leads are fixed to the platform 39 of the flexure 8 through the insulating sheet 38 (FIG. 3) as described above.

The suction pad 82 has a strip portion 91a formed by transversely extending a front end face 91 and a strip portion 91b extending backward (top left direction in FIG. 9) from the center of the portion 91a and is positioned so that the portion 91a contacts the platform 39 of the flexure 8 and the portion 91b contacts the intermediate portion between the two openings 21 and 22 (FIG. 3) when the front end face 91 moves along X-axis until it contacts the flexure 8 by passing through the opening 16 of the load beam 6. In this case, four suction holes 87, 88, 89, and 90 are formed at the portion 91a of the front end face 91 so that they almost fit the lead bonding positions of the platform 39. The damper 83a corresponds to action means for acting on the slider 25 and the suction table 83 corresponds to suction means having a damper serving as the action means and the suction pad 82.

An ultrasonic bonder 77 has a clamper arm 111 held by a rotation axis 110 supported to the base 72 so as to be rotatable on X-Z plane. The damper arm 111 holds an ultrasonic transducer 76 extending in almost parallel with X-axis and is set so that the front end of a wedge 78 formed at the front end of the ultrasonic transducer 76 to generate ultrasonic vibrations can act on the connection terminals 41, 42, 43, and 44 of four leads 32 held by the HG assembly 1 and the bonding pads 28, 29, 30, and 31 formed on the slider 25 as described later.

A cam 115 is rotatably supported by a rotation axis 114 supported by the base 72 along Y-axis and rotated by driving means (not shown) in the direction of the arrow L. A roller holding material 112 for rotatably holding a roller 113 contacting the outer periphery of the cam at the top of the rotation axis 114 is set to a position of the damper arm 111 facing the cam 115. FIG. 8 shows a state in which the roller 113 contacts with the largest-diameter portion of the cam 115. In this case, though the wedge 78 is going to rotate downward almost along Z-axis by the weight of the ultrasonic transducer 76 or the like, the roller 113 contacts the cam 115 to keep a controlled position separate, from the HG assembly 1.

Though the damper arm 111 holds the ultrasonic transducer 76, a balancer 116 for adjusting the pressure of the wedge 78 to be mentioned later is set to a position opposite to the ultrasonic transducer 76 about the rotation axis 110. The pressure adjustment is performed by adjusting the position of the balancer 116 from the rotation axis 110.

An ultrasonic generator 117 electrically drives the ultrasonic transducer 76 and ultrasonic vibrations the front-end wedge 78 along X-axis direction. A controller 84 is connected with the suction unit 80 through a tube 85 to draw the air incoming from the four suction holes 87, 88, 89, and 90 formed on the front end face 91 of the suction pad 82 so as to correspond to four leads and control the whole operation of the ultrasonic bonder 70 by controlling the ultrasonic generator 117 and driving means. In the above configuration, connecting operations controlled by the controller 84 will be described in order.

In the initial state of the ultrasonic bonder 70, X-Y tables 74 and 73 are present at standby positions where the bonding fixture 50 to be mounted can be easily set or removed. Then, when connecting operations are started, the mounted bonding fixture 50 is first moved to the position shown in FIG. 8, that is, the position at which the front end of the wedge 78 can act on the connection terminals 41, 42, 43, and 44 of the four leads 32 held by the HG assembly 1 and the bonding pads 28, 29, 30, and 31 formed on the slider 25. Then, the moving table 81 is loaded and moved to the left along X-axis and the front end face 91 (FIG. 9) of the suction pad 82 contacts the facing plane of the platform 39 as described above.

The moving table 81 further moves to the left and a pair of dampers 83a and 83a contact the facing plane of the slider 25 and stop. In this case, the suction pad 82 slightly presses the platform 39 and the front end face 91 closely contacts the platform 39.

Figure 10:
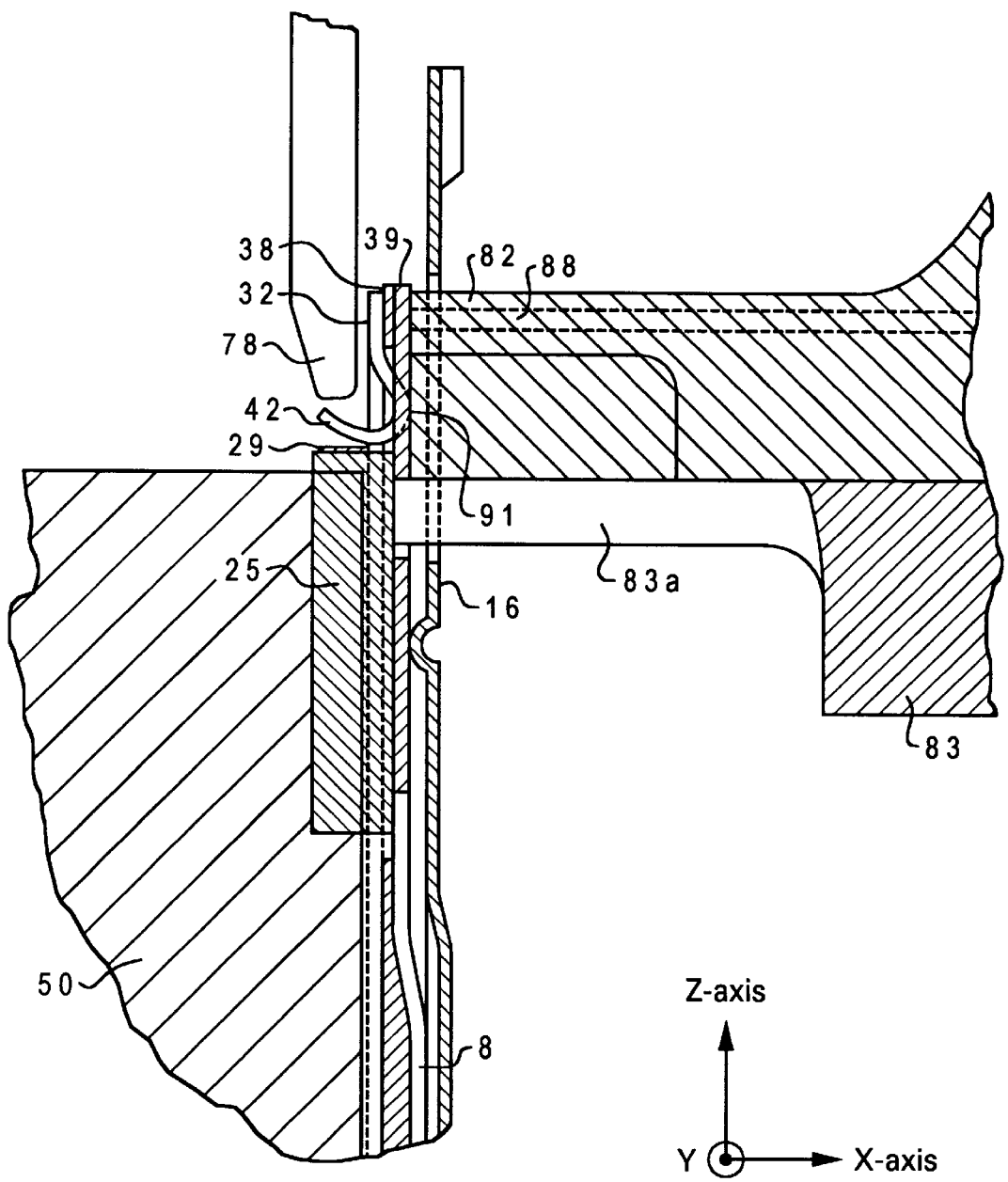
FIG. 10 is a sectional side view of the slider and suction pad of FIG. 9, and a clamper in operation.
Figure 11:
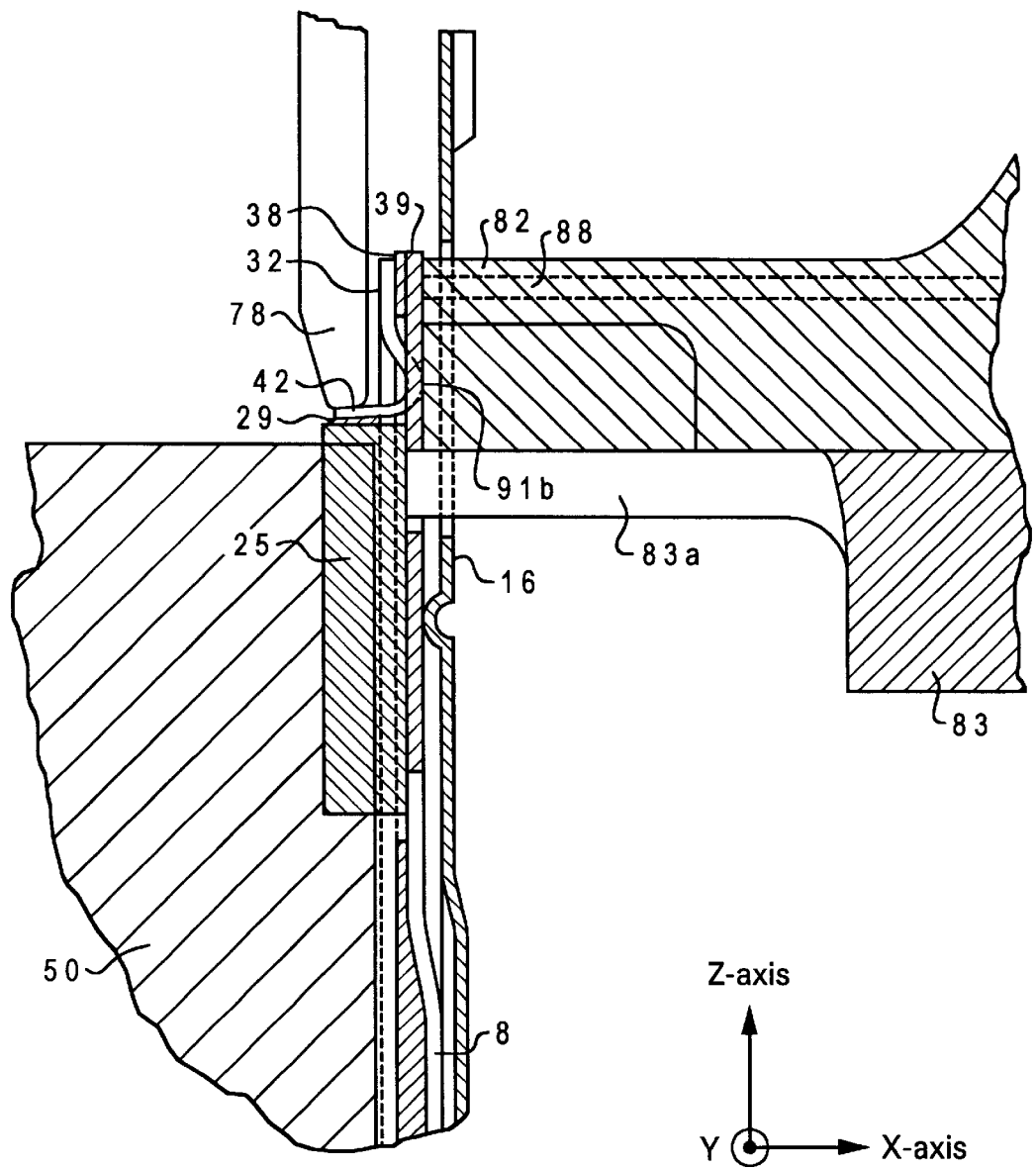
FIG. 11 is a sectional side view of the slider during ultrasonic bonding.
Figure 12:
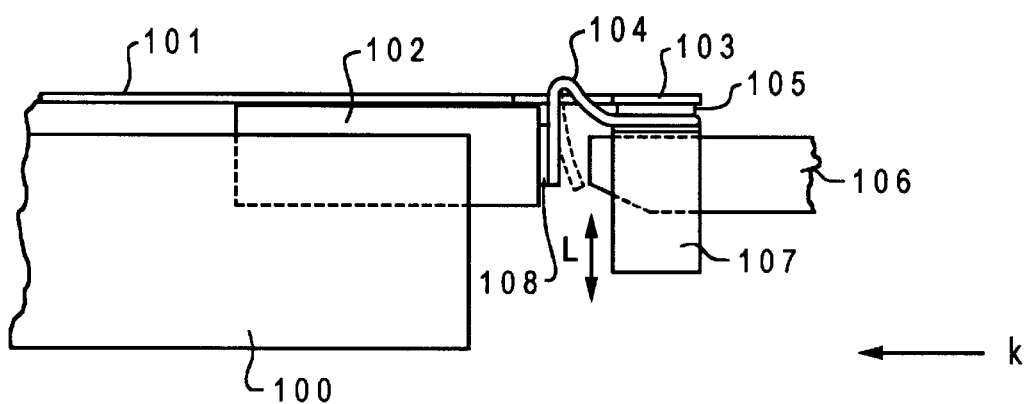
FIG. 12 is a side view of a slider during a conventional ultrasonic bonding method.
Figure 13:
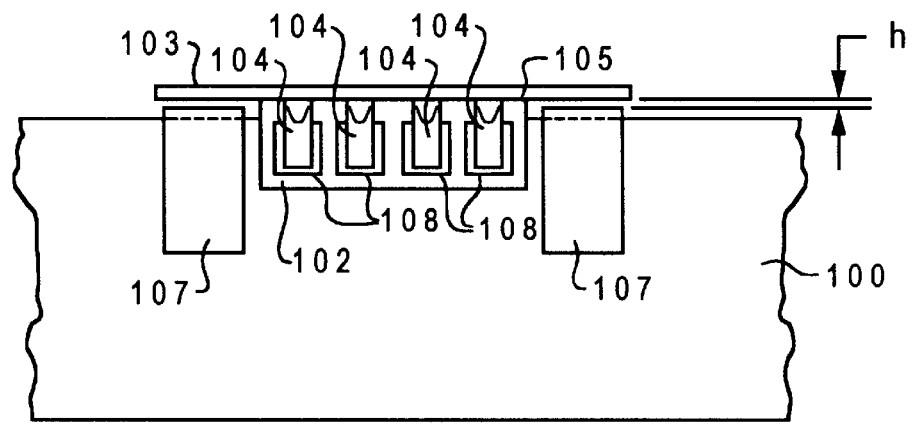
FIG. 13 is a side view of the slider during the ultrasonic bonding method of FIG. 12 when viewed from the direction of an arrow K of FIG. 12.

FIG. 10 is a sectional view of the bonding fixture 50 nearby a slider when viewing the cross section passing the center line 106 (FIG. 6) of the bonding fixture 50 from the direction of the arrow G after a controller starts suction under the above state. The slider 25 is firmly positioned by the slider fixing table 60 of the bonding fixture 50, slider fixing lever 56 (FIG. 7), and clamper 83a. Moreover, the platform 39 at the front end of the flexure 8 is attracted by the four suction holes 87, 88, 89, and 90 of the suction pad 82 and held by the front end face 91 of the suction pad 82. Then, the cam 115 is rotated in the direction of the arrow L so that the smallest-diameter portion is turned upward. In this case, wedge 78 presses the connection terminal 42 of the lead 32 and moreover, plastically deforms the curved portion of the lead 32 to press the curved portion against the bonding pad 29 with which the slider 25 contacts. FIG. 11 shows the above state.

When the lead 32 is plastically deformed, a force for bending the platform 39 of the flexure 8 works but the suction pad 82 for holding the platform 39 by the front end face 91 of the suction pad 82 prevents the force from working. Therefore, the end of the portion 91b of the front end face 91 is configured so as to face the slider 25 through the flexure 8 to prevent the suction pad 82 from moving to left. Then, by pressing the connection terminal 43 against the bonding pad 30 by the wedge 78, the wedge 78 is ultrasonic-vibrated. The vibrational direction is a direction along X-axis. The pressure in the above case is adjusted to a desired value by moving the position of the balancer 116 (FIG. 8).

Though the exciting condition depends on the diameter of the lead 32, the lead diameter is set to 50 μm, a load force is set to 75 gf, the ultrasonic frequency is set to 64 kHz, and the excitation time is set to 150 msec in case of the embodiment. The connecting operation is applied to corresponding four sets of connection terminals and four sets of bonding pads as shown in FIG. 9. Because the sequence for applying the connecting operation is properly set, the Y-table 73 moves along the Y-axis direction to move the bonding fixture 50 to an optimum position for the connecting operation.

The present invention is not restricted to the above embodiment but the present invention allows various modifications. For example, though the embodiment is configured so that the suction pad 82 slides on the suction table 83, it is also possible to integrally configure the pad 82 and the table 83.

Moreover, though the embodiment is configured so that the clamper 83 directly contacts the slider 25, it is also possible to use a configuration of bringing the clamper 83 into contact with a suspension tongue for holding the slider 25 so that the damper 83 indirectly acts on the slider.

Furthermore, the configuration of the bonding fixture 50 and ultrasonic bonder 70 is not restricted to the above embodiment. It is also possible to replace the configuration with means having the same function.

According to the present invention, the suction pad 82 contacts the platform 103 to fix it on the basis of the contact face of a slider with which the damper 83 serving as action means contacts. Therefore, it is possible to fix the platform 103 before ultrasonic-bond without being influenced by the accuracy of the bonding fixture 100 or positioning accuracy of the ultrasonic bonder 70. Therefore, it is possible to prevent a flexure after ultrasonic-bond from deforming.

While the invention has been particularly shown and described with reference to a preferred embodiment, it will be understood by those skilled in the art that various changes in form and detail may be made therein without departing from the spirit and scope of the invention.

What is claimed is:

1. A method for ultrasonically bonding a slider and a lead, comprising the steps of:
   providing a plurality of bonding pads on the slider integrally fixed to an elastic flexure accessible to a recording surface of a disk of a disk drive with a plurality of leads fixed to at least a platform of the flexure through ultrasonic waves and formed so that bonding portions of the leads respectively face each of the bonding pads;
   providing action means for acting on the slider and suction means having a suction pad for contacting the platform approaching the flexure;
   fixing the flexure by making the action means act on the slider and the suction pad contact and attract the platform; and
   bonding the leads with the bonding pads through ultrasonic waves by pressing bonding portions of the leads against the facing bonding pads.

2. The method according to claim 1, wherein suction holes equal to the number of the leads fixed to the platform are formed on the contact surface of the suction pad contacting with the platform.

3. The method according to claim 1, wherein the action means fixes the slider to a bonding fixture.

4. The method according to claim 1, wherein the suction pad is held by the suction means so as to be slidable on the action means.

* * * * *

UNITED STATES PATENT AND TRADEMARK OFFICE
CERTIFICATE OF CORRECTION

PATENT NO. : 6,321,974 B1
DATED : November 27, 2001
INVENTOR(S) : Tssuchiya et al.

It is certified that error appears in the above-identified patent and that said Letters Patent is hereby corrected as shown below:

<u>Column 6,</u>
Line 44, delete the word "damper" and replace it with the word -- clamper --.
Line 66, delete the "," after the word "separate."

<u>Column 8,</u>
Line 20, delete the word "damper" and replace it with the word -- clamper --.

Signed and Sealed this

Seventh Day of January, 2003

JAMES E. ROGAN
*Director of the United States Patent and Trademark Office*